(12) United States Patent
Xiao et al.

(10) Patent No.: US 9,072,062 B2
(45) Date of Patent: Jun. 30, 2015

(54) METHOD FOR CONTROLLING UPLINK POWER OF LONG TERM EVOLUTION SYSTEM, BASE STATION, MOBILE TERMINAL

(75) Inventors: Dengkun Xiao, Beijing (CN); Anjian Li, Beijing (CN); Yuan He, Beijing (CN); Jing Han, Beijing (CN); Wenjie Wang, Ulaanbaatar (CN); Chunfeng Yao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 480 days.

(21) Appl. No.: 13/446,561

(22) Filed: Apr. 13, 2012

(65) Prior Publication Data

US 2012/0196643 A1 Aug. 2, 2012

Related U.S. Application Data

(63) Continuation of application No. PCT/CN2010/077742, filed on Oct. 14, 2010.

(30) Foreign Application Priority Data

Oct. 14, 2009 (CN) .......................... 2009 1 0235462

(51) Int. Cl.
*H04B 7/00* (2006.01)
*H04W 52/30* (2009.01)
(Continued)

(52) U.S. Cl.
CPC ............ *H04W 52/30* (2013.01); *H04W 52/146* (2013.01); *H04W 52/343* (2013.01); *H04W 52/44* (2013.01); *H04W 52/34* (2013.01)

(58) Field of Classification Search
CPC ... H04W 52/146; H04W 52/30; H04W 52/34; H04W 52/343; H04W 52/44
USPC .......................................................... 455/522
See application file for complete search history.

(56) References Cited

U.S. PATENT DOCUMENTS 7,925,268 B2 4/2011 Sanders et al.
2010/0061480 A1* 3/2010 Kashiwase et al. ........... 375/295
(Continued)

FOREIGN PATENT DOCUMENTS

CN 1874179 12/2006
CN 101056129 10/2007
(Continued)

OTHER PUBLICATIONS

Athens, Greece; PUSCH Power Control for L TE-Advanced; Feb. 9-13, 2009; Nokia Siemens Networks, Nokia; R1-090738; Four pages.*
International Search Report for PCT/CN2010/077742 mailed Jan. 20, 2011.
(Continued)

*Primary Examiner* — Ping Hsieh
*Assistant Examiner* — Xin Jia
(74) *Attorney, Agent, or Firm* — Staas & Halsey LLP (57) ABSTRACT

A method for controlling uplink power of an LTE system, a base station, and a mobile terminal are disclosed according to the embodiments of the present invention. The method includes: obtaining uplink transmit power of each carrier; sending first notification signaling to a base station if a difference between the obtained uplink transmit power of each carrier exceeds a specific threshold; and sending second notification signaling to the base station if a sum of the obtained uplink transmit power of each carrier exceeds a preset threshold. Thresholds are determined according to network conditions, and uplink power of a carrier is adjusted in a balanced way, a bit error rate is reduced and a case that a low-performance carrier is forced to be interrupted is prevented.

9 Claims, 5 Drawing Sheets (51) Int. Cl.
  *H04W 52/14*  (2009.01)
  *H04W 52/34*  (2009.01)
  *H04W 52/44*  (2009.01)

(56) References Cited

U.S. PATENT DOCUMENTS

2010/0197339 A1* 8/2010 Pedersen et al. ............. 455/522
2010/0273515 A1* 10/2010 Fabien et al. ................ 455/509

FOREIGN PATENT DOCUMENTS

| CN | 101340622 | 1/2009 |
| CN | 101340711 | 1/2009 |
| CN | 101480091 | 7/2009 |
| CN | 101754393 | 6/2010 |
| WO | 2010/089284 | 8/2010 |

OTHER PUBLICATIONS

Nokia Siemens Networks, Nokia, "PUSCH Power Control for LTE-Advanced", 3GPP TSG RAN WG1 #56 BIS Meeting, Mar. 2009, pp. 1-4.
LG Electronics, "Uplink multiple channel transmission under UE transmit power limitation," 3GPP TSG RAN WG1 #56 BIS Meeting, Mar. 2009, pp. 1-3.
Samsung, "UL Transmission Power Control in LTE-A", 3GPP TSG RAN WG1 #56 BIS Meeting, Mar. 2009, pp. 1-5.
Huawei, "UL Power Control in Carrier Aggregation", 3GPP TSG RAN WG1 #58 BIS Meeting, Oct. 2009, pp. 1-4.
International Search Report mailed Jan. 20, 2011 issued in corresponding International Patent Application No. PCT/CN2010/077742.
Written Opinion of the International Search Authority mailed Jan. 20, 2011 issued in corresponding International Patent Application No. PCT/CN2010/077742.
Office Action, dated Apr. 23, 2013, in corresponding Chinese Application No. 200910235462.0 (18 pp.).
Extended European Search Report dated Jun. 21, 2012 issued in corresponding European Patent Application No. 10823073.1.
Huawei, "UL Power Control in Carrier Aggregation", 3GPP TSG RAN WG1 Meeting #58, Oct. 2009, 4 pages.
First Chinese Office Action issued Aug. 2, 2012 in corresponding Chinese Patent Application No. 200910235462.0.

* cited by examiner

METHOD FOR CONTROLLING UPLINK POWER OF LONG TERM EVOLUTION SYSTEM, BASE STATION, MOBILE TERMINAL

This application is a continuation of International Application No. PCT/CN2010/077742, filed on Oct. 14, 2010, which claims priority to Chinese Patent Application No. 200910235462.0, filed on Oct. 14, 2009, both of which are hereby incorporated by reference in their entireties.

FIELD OF THE INVENTION

The present invention relates to the Long Term Evolution LTE technology, and in particular, to a method for controlling uplink power of an LTE system, a base station, and a mobile terminal.

BACKGROUND OF THE INVENTION

Currently, a method for controlling uplink power of an LTE-A (Long-term evolution advance, Long-Term Evolution Advanced) system mainly includes: judging whether a sum of transmit power on all carriers exceeds maximum transmit power of a mobile terminal; if the sum of the transmit power on all carriers exceeds the maximum transmit power of the mobile terminal, reducing the transmit power on each carrier according to the same offset or reducing the transmit power on each carrier according to different offsets to make the sum of transmit power on all carriers does not exceed the maximum transmit power of the mobile terminal.

In the process of implementing the present invention, the inventor finds the prior art has at least the following problems:

The transmit power of each carrier is reduced, which reduces the power of a band under a poor channel condition and also brings a greater bit error rate. Even worse, a certain carrier may be forced to be interrupted after the transmit power is reduced due to the low performance of the carrier.

SUMMARY OF THE INVENTION

Embodiments of the present invention provide a method for controlling uplink power of an LTE system, a base station, and a mobile terminal, so that uplink power of each carrier can be balanced and a case that a low-performance carrier is forced to be interrupted is prevented.

An embodiment of the present invention provides a method for controlling uplink power of an LTE system, including:

obtaining uplink transmit power of each carrier;

sending first notification signaling to a base station if a difference between the obtained uplink transmit power of each carrier exceeds a specific threshold, where the specific threshold is determined according to a power amplifier parameter applied to carrier aggregation and receiver performance of a mobile terminal; and sending second notification signaling to the base station if a sum of the obtained uplink transmit power of each carrier exceeds a preset threshold, where the preset threshold is determined according to maximum transmit power of the mobile terminal, maximum allowed power configured by the base station, and a resource management parameter planned by a network.

An embodiment of the present invention provides a mobile terminal, including:

an obtaining module, configured to obtain uplink transmit power of each carrier;

a comparing module, configured to: compare whether a difference between the uplink transmit power of each carrier obtained by the obtaining module exceeds a specific threshold, or compare whether a sum of the uplink transmit power of each carrier obtained by the obtaining module exceeds a preset threshold; and a notifying module, configured to: send first notification signaling to a base station if the difference between the obtained uplink transmit power of each carrier, where the difference is obtained through comparing by the comparing module, exceeds the specific threshold, or send second notification signaling to the base station if the sum of the obtained uplink transmit power of each carrier, where the sum is obtained through comparing by the comparing module, exceeds the preset threshold.

An embodiment of the present invention further provides a method for controlling uplink power of an LTE system, including:

receiving first notification signaling or second notification signaling sent by a mobile terminal, where the first notification signaling carries information indicating that a difference between uplink transmit power of each carrier exceeds a specific threshold, and the second notification signaling carries information indicating that a sum of the uplink transmit power of each carrier exceeds a preset threshold; and perform carrier adjustment according to the information that is carried in the first notification signaling and indicates that the difference between the uplink transmit power of each carrier exceeds the specific threshold, or according to the information that is carried in the second notification signaling and indicates that the sum of the uplink transmit power of each carrier exceeds the preset threshold.

An embodiment of the present invention provides a base station, including:

a receiving unit, configured to receive first notification signaling or second notification signaling sent by a mobile terminal, where the first notification signaling carries information indicating that a difference between uplink transmit power of each carrier exceeds a specific threshold, and the second notification signaling carries information indicating that a sum of the uplink transmit power of each carrier exceeds a preset threshold; and a carrier adjusting unit, configured to perform carrier adjustment according to the information that is carried in the first notification signaling and indicates that the difference between the uplink transmit power of each carrier exceeds the specific threshold, or according to the information that is carried in the second notification signaling and indicates that the sum of the uplink transmit power of each carrier exceeds the preset threshold.

With the technical solutions provided in the embodiments of the present invention, uplink transmit power of each carrier is obtained; first notification signaling is sent to a base station if a difference between the obtained uplink transmit power of each carriers exceeds a specific threshold, where the specific threshold is determined according to a power amplifier parameter applied to carrier aggregation and receiver performance of a mobile terminal; and second notification signaling is sent to the base station if a sum of the obtained uplink transmit power of each carrier exceeds a preset threshold, where the preset threshold is determined according to maximum transmit power of the mobile terminal, maximum allowed power configured by the base station, and a resource management parameter planned by a network. With comprehensive consideration of network conditions, the uplink power of a carrier is adjusted in a balanced way, a bit error rate is reduced, and a case that a low-performance carrier is forced to be interrupted is prevented.

BRIEF DESCRIPTION OF THE DRAWINGS

To describe the technical solutions of embodiments of the present invention more clearly, the following outlines the accompanying drawings involved in the description of the embodiments of the present invention. Apparently, the accompanying drawings outlined below are merely about some embodiments of the present invention, and persons of ordinary skill in the art can derive other drawings from them without making any creative effort.

DETAILED DESCRIPTION OF THE EMBODIMENTS

The technical solutions of the embodiments of the present invention are described clearly and comprehensively in the following with reference to the accompanying drawings. Evidently, the embodiments to be described are only some, rather than all embodiments of the present invention. All other embodiments, which can be derived by those skilled in the art from the embodiments given herein without any creative effort, shall fall within the protection scope of the present invention.

Figure 1:
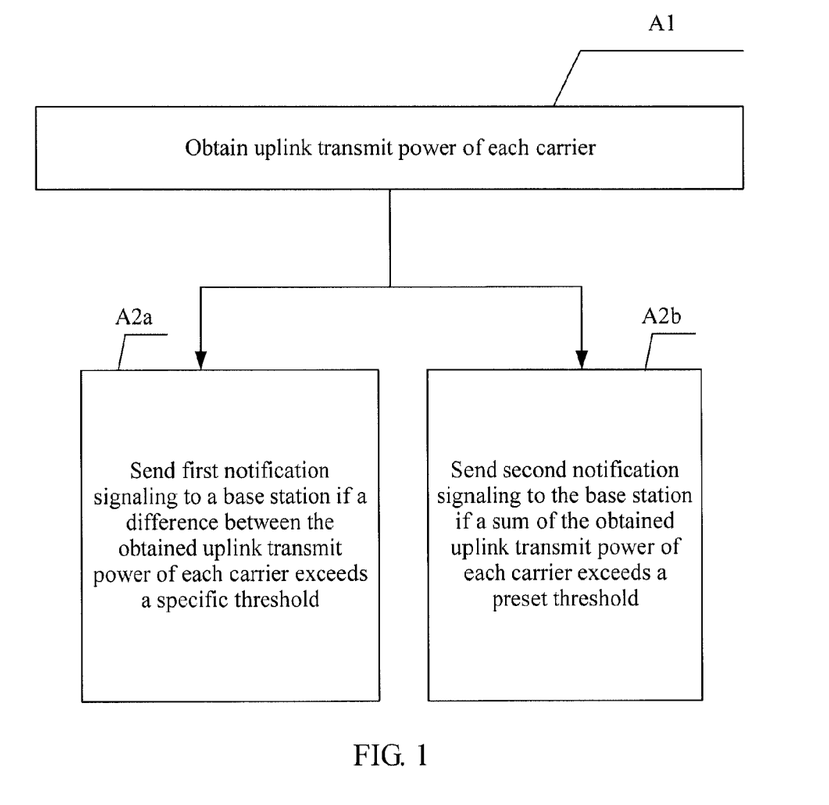
FIG. 1 is a flowchart of a method for controlling uplink power of an LTE system with regard to a mobile terminal according to an embodiment of the present invention.

A technical solution of a method for controlling uplink power of an LTE system with regard to a mobile terminal is provided in an embodiment of the present invention. As shown in FIG. 1, the method includes the following steps:

A1. Obtain uplink transmit power of each carrier.

A2a. Send first notification signaling to a base station if a difference between the obtained uplink transmit power of each carrier exceeds a specific threshold.

A2b. Send second notification signaling to the base station if a sum of the obtained uplink transmit power of each carrier exceeds a preset threshold.

The specific threshold in step A2a is determined according to the power amplifier parameter applied to the carrier aggregation and the receiver performance of a mobile terminal. Specifically, $$M_2 = P_T - \Delta_2$$

In the formula above, $M_2$ is the specific threshold, and $P_T$ is determined according to a power amplifier parameter applied to carrier aggregation, and $\Delta_2$ is determined according to receiver performance of the mobile terminal. For example, a proper value may be determined through in-advance emulating. The configured parameter of $\Delta_2$ may be sent by the base station to a terminal through uplink scheduling permission signaling.

The preset threshold in step A2b is determined according to the maximum transmit power of the mobile terminal, the maximum allowed power configured by the base station, and a resource management parameter planned by a network. Specifically, $$M_1 = P_{max} - \Delta_1$$

In the formula above, $M_1$ is a preset threshold; $P_{max}$ is a smaller value of the maximum transmit power of the mobile terminal and the maximum allowed power configured by the base station; $\Delta_1$ is determined according to a resource management parameter planned by a network. For example, a proper value may be determined through in-advance emulating. The configured parameter of $\Delta_1$ may be sent by the base station to a terminal through uplink scheduling permission signaling.

For example, $P_T$ may be a dynamic range of the output power of the mobile terminal. $\Delta_1$ may be obtained through emulation in which the uplink throughput of the mobile terminal is made to be maximal. $\Delta_2$ may be obtained through emulation in which the uplink throughput of the mobile terminal is made to be maximal.

In the foregoing technical solution, for a corresponding manner of the first notification signaling, the base station may add a parameter in existing signaling to perform notification, for example, a parameter flag1 is added in the signaling. When a difference between the obtained uplink transmit power of different carriers exceeds the specific threshold, flag1 is set to "1" to notify the base station. Notification may also be performed by adding new signaling, for example, adding uplink power adjustment signaling. If the uplink power adjustment signaling is "0", it indicates that the difference between the obtained uplink transmit power of different carriers exceeds the specific threshold. For a corresponding manner of the second notification signaling, notification may be performed by adding a parameter in the signaling, for example, adding a parameter flag2 in the signaling. When a sum of the obtained uplink transmit power of each carrier exceeds the preset threshold, flag2 is set to "1" to notify the base station. Alternatively, notification may also be performed by adding new signaling, for example, adding uplink power adjustment signaling. If the uplink power adjustment signaling is "1", it indicates that the sum of the obtained uplink transmit power of each carrier exceeds the preset threshold. If the uplink power adjustment signaling is "2", it indicates that the sum of the uplink transmit power of each carrier exceeds the preset threshold and the difference between the uplink transmit power of different carriers also exceeds the specific threshold. If no uplink power adjustment signaling is sent, it indicates that neither the sum of the obtained uplink transmit power of each carrier exceeds the preset threshold nor the difference between the obtained uplink transmit power of different carriers exceeds the specific threshold. The added signaling may be transmitted through a PUCCH.

According to the technical solution provided in this embodiment of the present invention, it can be seen that uplink transmit power of each carrier is obtained; first notification signaling is sent to a base station if a difference between the obtained uplink transmit power of each carrier exceeds a specific threshold, where the specific threshold is determined according to a power amplifier parameter applied to carrier aggregation and receiver performance of a mobile terminal; and second notification signaling is sent to the base station if a sum of the obtained uplink transmit power of each carrier exceeds a preset threshold, where the preset threshold is determined according to maximum transmit power of the mobile terminal, maximum allowed power configured by the base station, and a resource management parameter planned by a network. With comprehensive consideration of network conditions, uplink power of a carrier is adjusted in a balanced way, a bit error rate is reduced, and a case that a low-performance carrier is forced to be interrupted is prevented.

The foregoing steps may be performed by a mobile terminal.

Figure 2:
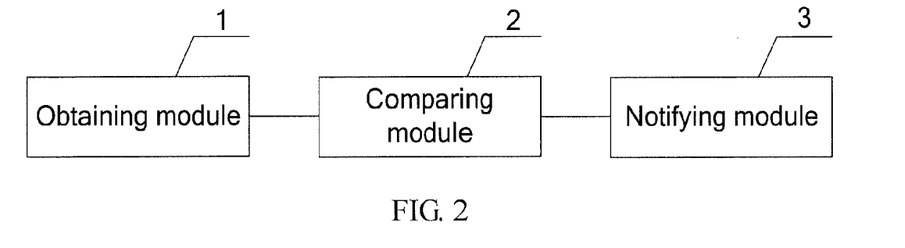
FIG. 2 is a schematic structural diagram of a mobile terminal according to an embodiment of the present invention.

Corresponding to the foregoing method embodiment, an embodiment of the present invention provides a mobile terminal. As shown in FIG. 2, the mobile terminal includes:

an obtaining module 1, configured to obtain uplink transmit power of each carrier;

a comparing module 2, configured to: compare whether a difference between the uplink transmit power of each carrier obtained by the obtaining module 1 exceeds a specific threshold, or compare whether a sum of the uplink transmit power of each carrier obtained by the obtaining module 1 exceeds a preset threshold; and a notifying module 3, configured to: send first notification signaling to a base station if the difference between the obtained uplink transmit power of each carrier, where the difference is obtained through comparing by the comparing module 2, exceeds the specific threshold, or send second notification signaling to the base station if the sum of the obtained uplink transmit power of each carrier, where the sum is obtained through comparing by the comparing module 2, exceeds the preset threshold.

For a corresponding manner of the first notification signaling, the base station may add a parameter in existing signaling to perform notification, for example, a parameter flag1 is added in the signaling. When the difference between the obtained uplink transmit power of different carriers exceeds the specific threshold, flag1 is set to "1" to notify the base station. Notification may also be performed by adding new signaling, for example, adding uplink power adjustment signaling. If the uplink power adjustment signaling is "0", it indicates that the difference between the obtained uplink transmit power of different carriers exceeds the specific threshold. For a corresponding manner of the second notification signaling, notification may be performed by adding a parameter in the signaling, for example, adding a parameter flag2 in the signaling. When the sum of the obtained uplink transmit power of each carrier exceeds the preset threshold, flag2 is set to "1" to notify the base station. Alternatively, notification may also be performed by adding new signaling, for example, adding uplink power adjustment signaling. If the uplink power adjustment signaling is "1", it indicates that the sum of the obtained uplink transmit power of each carrier exceeds the preset threshold. If the uplink power adjustment signaling is "2", it indicates that the sum of the uplink transmit power of each carrier exceeds the preset threshold and the difference between the uplink transmit power of different carriers also exceeds the specific threshold. If no uplink power adjustment signaling is sent, it indicates that neither the sum of the uplink transmit power of each carrier exceeds the preset threshold nor the difference between the obtained uplink transmit power of different carriers exceeds the specific threshold. The added signaling may be transmitted through a PUCCH.

Figure 3:
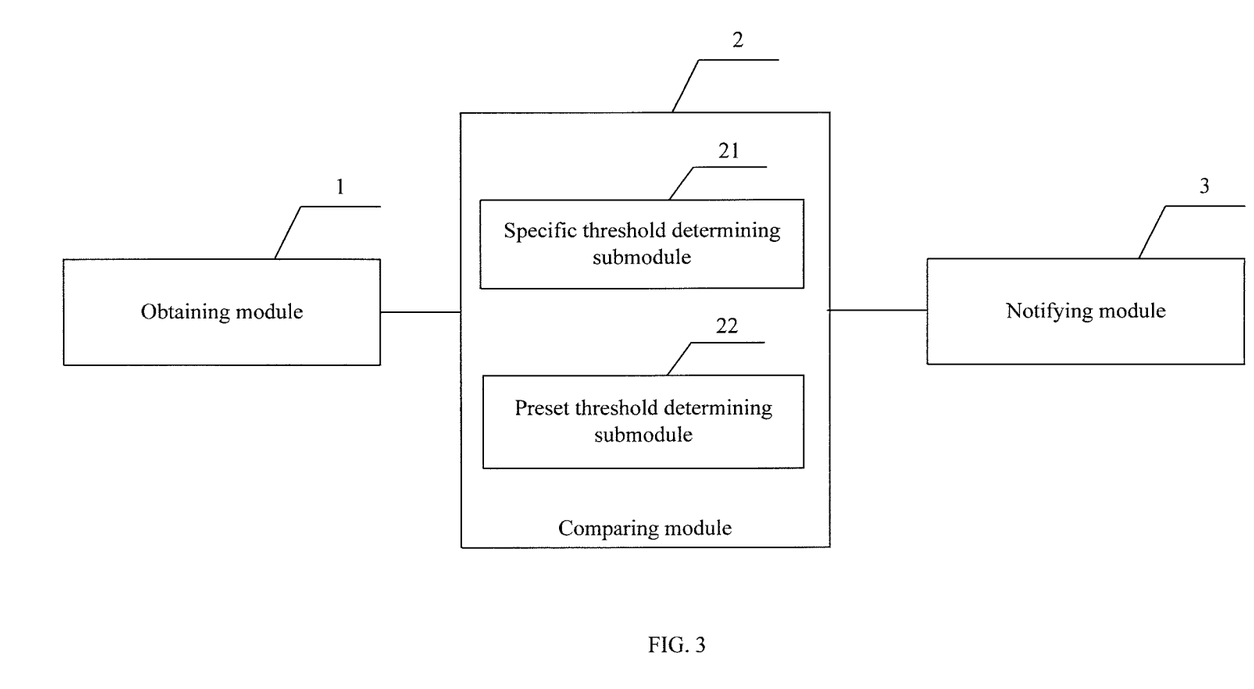
FIG. 3 is another schematic structural diagram of a mobile terminal according to an embodiment of the present invention.

Further, as shown in FIG. 3, the comparing module 2 includes a specific threshold determining submodule 21 and a preset threshold determining submodule 22.

The specific threshold determining submodule 21 is configured to determine a specific threshold $M_2$ according to a difference between a power amplifier parameter $P_T$ applied to carrier aggregation and a receiver performance parameter $\Delta_2$ of a mobile terminal.

The preset threshold determining submodule 22 is configured to determine a preset threshold $M_1$ according to a difference between a minimum value $P_{max}$ and a resource management parameter $\Delta_1$ that is planned by a network, where the minimum value $P_{max}$ is a smaller value of maximum transmit power of the mobile terminal and maximum allowed power configured by the base station.

According to the technical solution provided in this embodiment of the present invention, it can be seen that uplink transmit power of each carrier is obtained; first notification signaling is sent to a base station if a difference between the obtained uplink transmit power of each carrier exceeds a specific threshold, where the specific threshold is determined according to a power amplifier parameter applied to carrier aggregation and receiver performance of a mobile terminal; and second notification signaling is sent to the base station if a sum of the obtained uplink transmit power of each carrier exceeds a preset threshold, where the preset threshold is determined according to maximum transmit power of the mobile terminal, maximum allowed power configured by the base station, and a resource management parameter planned by a network. With comprehensive consideration of network conditions, uplink power of a carrier is adjusted in a balanced way, a bit error rate is reduced, and a case that a low-performance carrier is forced to be interrupted is prevented.

Figure 4:
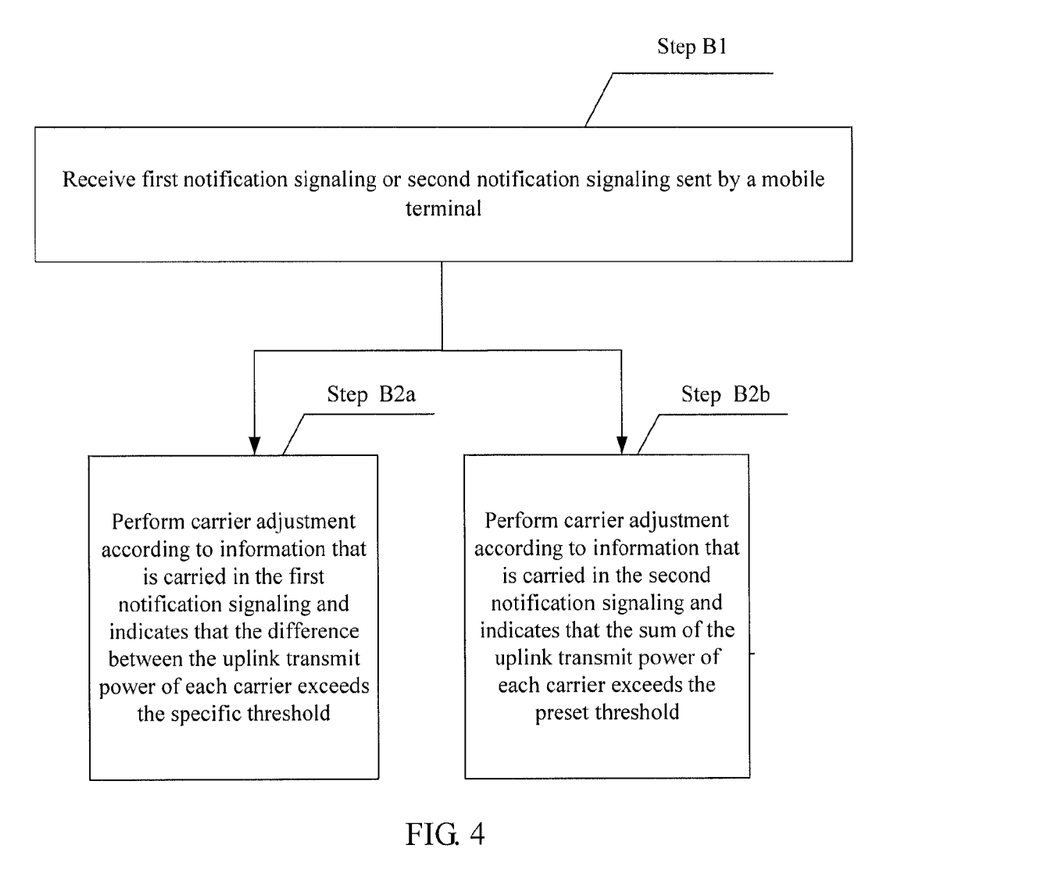
FIG. 4 is a schematic flowchart of a method for controlling uplink power of an LTE system with regard to a base station according to an embodiment of the present invention.

Corresponding to the foregoing method embodiment applied on the mobile terminal, a technical solution of a method for controlling uplink power of an LTE system with regard to a base station is provided in an embodiment of the present invention. As shown in FIG. 4, the method includes the following steps:

Step B1: Receive first notification signaling or second notification signaling sent by a mobile terminal, where the first notification signaling carries information indicating that a difference between uplink transmit power of each carrier exceeds a specific threshold, and the second notification signaling carries information indicating that a sum of the uplink transmit power of each carrier exceeds a preset threshold.

Step B2a: Perform carrier adjustment according to the information that is carried in the first notification signaling and indicates that the difference between the uplink transmit power of each carrier exceeds the specific threshold; or Step B2b: Perform carrier adjustment according to the information that is carried in the second notification signaling and indicates that the sum of the uplink transmit power of each carrier exceeds the preset threshold.

Step B2a may include:

adjusting uplink power of a heavier-loaded carrier to a lighter-loaded carrier if a power control requirement can be fulfilled by adjusting the uplink power of the heavier-loaded carrier to the lighter-loaded carrier; or decreasing physical resource blocks of a non real-time service if a power control requirement can be fulfilled by decreasing the physical resource blocks of the non real-time service; or interrupting a low-performance carrier.

Step B2b may include:

perform carrier adjustment according to the information that is carried in the second notification signaling and indicates that the sum of the uplink transmit power of each carrier exceeds the preset threshold:

adjusting uplink power of a heavier-loaded carrier to a lighter-loaded carrier if a power control requirement can be fulfilled by adjusting the uplink power of the heavier-loaded carrier to the lighter-loaded carrier; or decreasing physical resource blocks of a non real-time service if a power control requirement can be fulfilled by decreasing the physical resource blocks of the non real-time service; or interrupting a low-performance carrier; or deferring sending service data on carriers and affixing a mark if the sending of obtained service data on each carrier can be deferred.

In the foregoing steps, the sequence numbers of step B2a and step B2b do not represent the order of performing the steps. A corresponding power control requirement may be: As estimated by the base station, the difference between the uplink transmit power of different carriers does not exceed the specific threshold after the sending of the service data on the carriers is deferred; or the sum of the uplink transmit power of each carrier does not exceed the preset threshold after the sending of the service data on the carriers is deferred; or the difference between the uplink transmit power of different carriers does not exceed the specific threshold after the uplink power is adjusted to another carrier; or the sum of the uplink transmit power of each carrier does not exceed the preset threshold after the uplink power is adjusted to another carrier; or the difference between the uplink transmit power of different carriers does not exceed the specific threshold after the physical resource blocks of the non real-time service are decreased; or the sum of the uplink transmit power of each carrier does not exceed the preset threshold after the physical resource blocks of the non real-time service are decreased; or after the carrier adjustment is performed, neither the difference between the uplink transmit power of different carriers exceeds the specific threshold nor the sum of the uplink transmit power of each carrier exceeds the preset threshold.

According to the technical solution provided in this embodiment of the present invention, it can be seen that uplink transmit power of each carrier is obtained; first notification signaling is sent to a base station if a difference between the obtained uplink transmit power of each carrier exceeds a specific threshold, where the specific threshold is determined according to a power amplifier parameter applied to carrier aggregation and receiver performance of a mobile terminal; and second notification signaling is sent to the base station if a sum of the obtained uplink transmit power of each carrier exceeds a preset threshold, where the preset threshold is determined according to maximum transmit power of the mobile terminal, maximum allowed power configured by the base station, and a resource management parameter planned by a network. With comprehensive consideration of network conditions, uplink power of a carrier is adjusted in a balanced way, a bit error rate is reduced, and a case that a low-performance carrier is forced to be interrupted is prevented.

Figure 5:
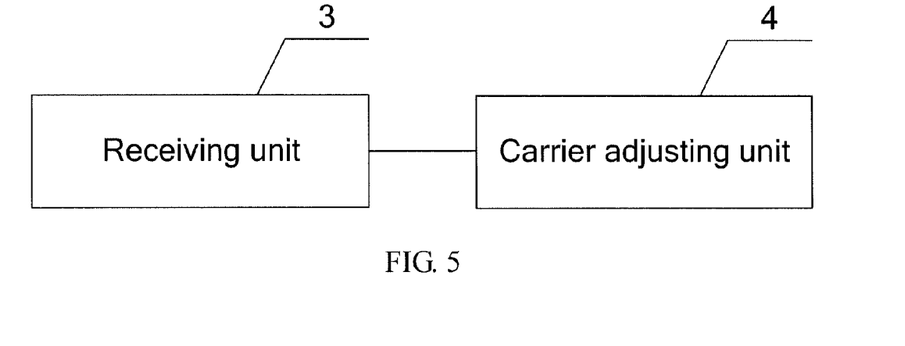
FIG. 5 is a schematic structural diagram of a base station according to an embodiment of the present invention.

Corresponding to the method embodiment applied on the base station, an embodiment of the present invention provides a base station. As shown in FIG. 5, the base station includes:

a receiving unit 3, configured to receive first notification signaling or second notification signaling sent by a mobile terminal, where the first notification signaling carries information indicating that a difference between uplink transmit power of each carrier exceeds a specific threshold, and the second notification signaling carries information indicating that a sum of the uplink transmit power of each carrier exceeds a preset threshold; and a carrier adjusting unit 4, configured to perform carrier adjustment according to the information that is carried in the first notification signaling and indicates that the difference between the uplink transmit power of each carrier exceeds the specific threshold, or according to the information that is carried in the second notification signaling and indicates that the sum of the uplink transmit power of each carrier exceeds the preset threshold.

Figure 6:
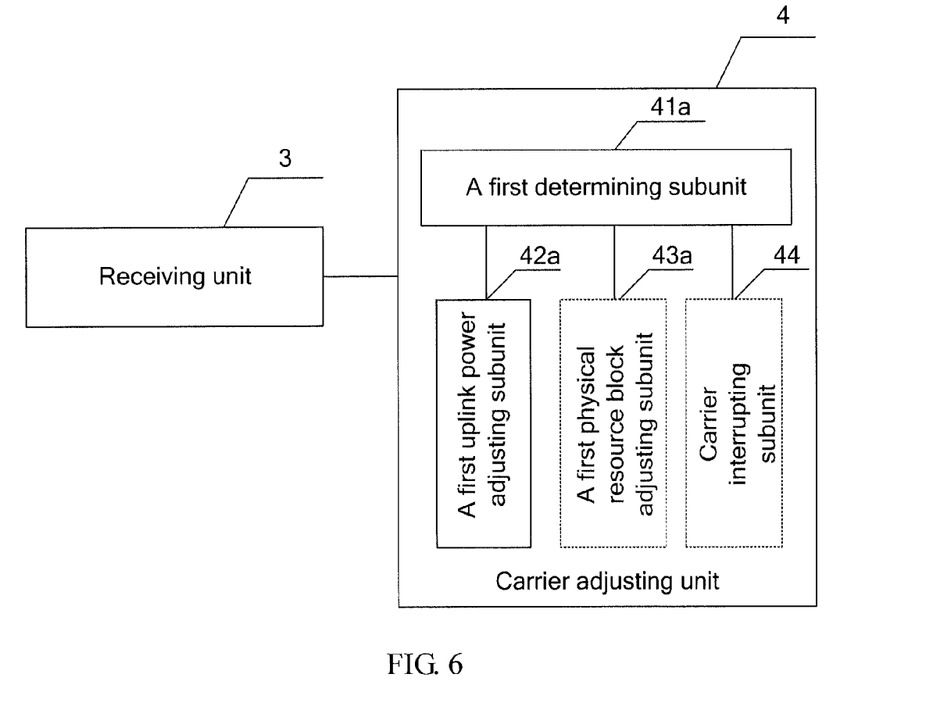
FIG. 6 is another schematic structural diagram of a base station according to an embodiment of the present invention.

When the carrier adjusting unit 4 in the base station is specifically configured to perform the carrier adjustment according to the information that is carried in the first notification signaling and indicates that the difference between the uplink transmit power of each carrier exceeds the specific threshold, as shown in FIG. 6, the carrier adjusting unit 4 includes:

a first determining subunit 41a, configured to determine whether a power control requirement can be fulfilled by adjusting the obtained uplink power of a heavier-loaded carrier to a lighter-loaded carrier, or determine whether a power control requirement can be fulfilled by decreasing physical resource blocks of a non real-time service;

a first uplink power adjusting subunit 42a, configured to adjust the uplink power of the heavier-loaded carrier to the lighter-loaded carrier after the first determining subunit 41a determines that the power control requirement can be fulfilled by adjusting the obtained uplink power of the heavier-loaded carrier to the lighter-loaded carrier;

a first physical resource block adjusting subunit 43a, configured to decrease the physical resource blocks of the non real-time service after the first determining subunit 41a determines that the power control requirement can be fulfilled by decreasing the physical resource blocks of the non real-time service; and a carrier interrupting subunit 44, configured to interrupt a low-performance carrier.

Figure 7:
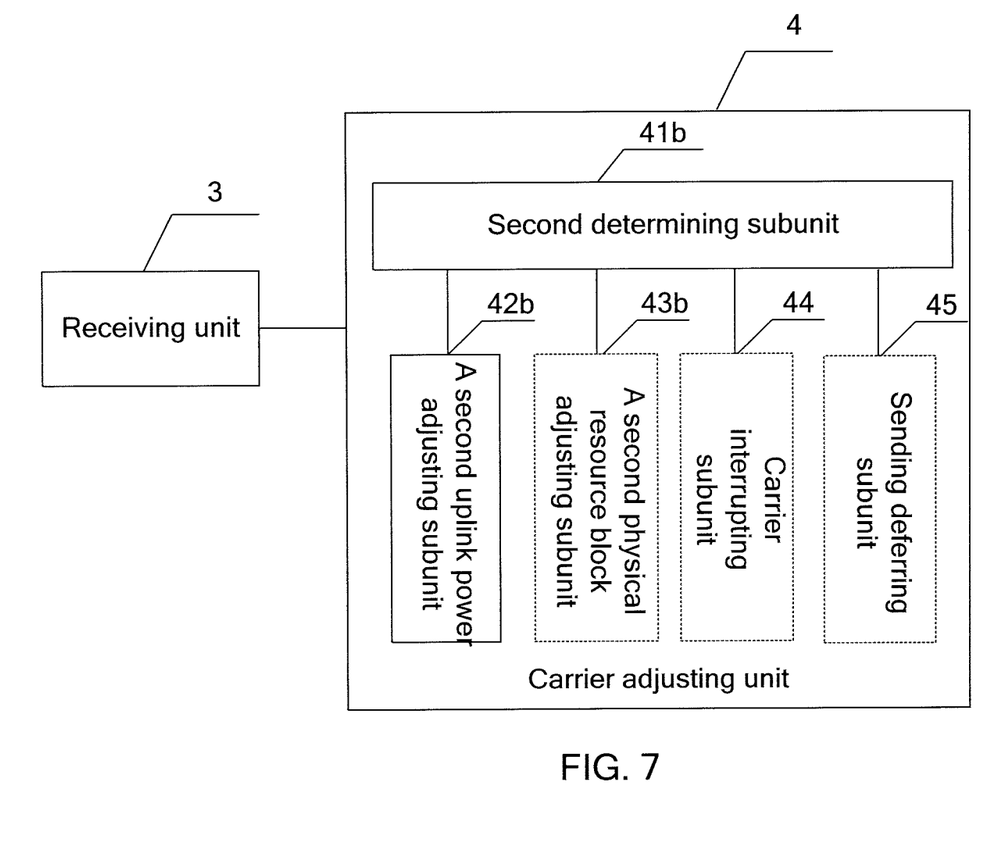
FIG. 7 is another schematic structural diagram of a base station according to an embodiment of the present invention.

When the carrier adjusting unit 4 in the base station is specifically configured to perform the carrier adjustment according to the information that is carried in the second notification signaling and indicates that the sum of the uplink transmit power of each carrier exceeds the preset threshold, the carrier adjusting unit 4 includes:

a second determining subunit 41b, configured to determine whether a power control requirement can be fulfilled by adjusting the obtained uplink power of a heavier-loaded carrier to a lighter-loaded carrier; or determine whether a power control requirement can be fulfilled by decreasing physical resource blocks of a non real-time service; or determine whether the sending of obtained service data on each carrier can be deferred;

a second uplink power adjusting subunit 42b, configured to adjust the uplink power of the heavier-loaded carrier to the lighter-loaded carrier after the second determining subunit 41b determines that the power control requirement can be fulfilled by adjusting the obtained uplink power of the heavier-loaded carrier to the lighter-loaded carrier;

a second physical resource block adjusting subunit 43b, configured to decrease the physical resource blocks of the non real-time service after the second determining subunit 41b determines that the power control requirement can be fulfilled by decreasing the physical resource blocks of the non real-time service;

a carrier interrupting subunit 44, configured to interrupt a low-performance carrier; and a sending deferring subunit 45, configured to defer sending service data on carriers and affix a mark after the second determining subunit 41b determines that the sending of the obtained service data on each carrier can be deferred.

In each unit above, a corresponding power control requirement may be: As estimated by the base station, the difference between the uplink transmit power of different carriers does not exceed the specific threshold after the sending of the service data on the carriers is deferred; or the sum of the uplink transmit power of each carrier does not exceed the preset threshold after the sending of the service data on the carriers is deferred; or the difference between the uplink transmit power of different carriers does not exceed the specific threshold after the uplink power is adjusted to another carrier; or the sum of the uplink transmit power of each carrier does not exceed the preset threshold after the uplink power is adjusted to another carrier; or the difference between the uplink transmit power of different carriers does not exceed the specific threshold after the physical resource blocks of the non real-time service are decreased; or the sum of the uplink transmit power of each carrier does not exceed the preset threshold after the physical resource blocks of the non real-time service are decreased; or after the carrier adjustment is performed, neither the difference between the uplink transmit power of different carriers exceeds the specific threshold nor the sum of the uplink transmit power of each carrier exceeds the preset threshold.

According to the technical solution provided in this embodiment of the present invention, it can be seen that uplink transmit power of each carrier is obtained; first notification signaling is sent to a base station if a difference between the obtained uplink transmit power of each carrier exceeds a specific threshold, where the specific threshold is determined according to a power amplifier parameter applied to carrier aggregation and receiver performance of a mobile terminal; and second notification signaling is sent to the base station if a sum of the obtained uplink transmit power of each carrier exceeds a preset threshold, where the preset threshold is determined according to maximum transmit power of the mobile terminal, maximum allowed power configured by the base station, and a resource management parameter planned by a network. With comprehensive consideration of network conditions, uplink power of a carrier is adjusted in a balanced way, a bit error rate is reduced, and a case that a low-performance carrier is forced to be interrupted is prevented.

Persons of ordinary skill in the art understand that all or part of the steps of the method provided in the embodiments above may be implemented by a computer program instructing relevant hardware. The program may be stored in computer readable storage media. When the program runs, the program executes the steps of the method specified in any embodiment above. The storage media may be a magnetic disk, compact disk, read-only memory (Read-Only Memory, ROM), or random access memory (Random Access Memory, RAM).

With a method for controlling uplink power of an LTE system, a base station, and a mobile terminal according to the embodiments of the present invention, through $\Delta_1$ and $\Delta_2$, all network conditions are taken into consideration to determine corresponding thresholds; and the sending of service data on carriers is deferred, or uplink power is adjusted to another carrier, or physical resource blocks of a non real-time service are decreased, so as to control the uplink power. In this way, carriers with excessive uplink power can be solved specifically, without the need of controlling the uplink power of each carrier, thereby avoiding a case that a certain carrier is forced to be interrupted after transmit power is reduced due to low performance of the carrier, adjusting uplink power of a carrier in a balanced way, and reducing a bit error rate. The embodiments of the present invention are not only applicable to an LTE-A system, but also applicable to an LTE system and other channels such as physical uplink shared channel (PUSCH, Physical Uplink Shared Channel) or physical uplink control channel (PUCCH, Physical Uplink Control Channel).

The above description is merely exemplary embodiments of the present invention, but not intended to limit the protection scope of the present invention. Within the technical scope disclosed by the present invention, any variation or replacement that can be easily derived by those skilled in the art shall fall within the protection scope of the present invention. Therefore, the protection scope of the present invention is subject to the appended claims.

What is claimed is:

1. A method for controlling uplink power of a Long Term Evolution (LTE) system, comprising:
   obtaining, by a mobile terminal, uplink transmit powers of carriers;
   sending, by the mobile terminal, first notification signaling to a base station if a difference between the obtained uplink transmit powers of different carriers exceeds a specific threshold, wherein the specific threshold is determined according to a power amplifier parameter applied to carrier aggregation and receiver performance of the mobile terminal; and
   sending, by the mobile terminal, second notification signaling to the base station if a sum of the obtained uplink transmit powers of carriers exceeds a preset threshold, wherein the preset threshold is determined according to maximum transmit power of the mobile terminal, maximum allowed power configured by the base station, and a resource management parameter planned by a network,
   wherein the specific threshold comprises:

$M_2 = P_T - \Delta_2$, wherein $M_2$ is the specific threshold, $P_T$ is determined according to the power amplifier parameter applied to the carrier aggregation, and $\Delta_2$ is determined according to the receiver performance of the mobile terminal;
   the preset threshold comprises:

$M_1 = P_{max} - \Delta_1$, wherein $M_1$ is the preset threshold, $P_{max}$ is a smaller value of the maximum transmit power of the mobile terminal and the maximum allowed power configured by the base station, and $\Delta_1$ is determined according to the resource management parameter planned by the network.

2. The method according to claim 1, wherein:
   the base station performs carrier adjustment according to information carried in the first notification signaling which indicates that the difference between the uplink transmit powers of different carriers exceeds the specific threshold, or according to information carried in the second notification signaling which indicates that the sum of the uplink transmit powers of carriers exceeds the preset threshold.

3. A mobile terminal, comprising:
   an obtaining module, configured to obtain uplink transmit powers of carriers;
   comparing module, configured to: compare whether a difference between the uplink transmit powers of different carriers obtained by the obtaining module exceeds a specific threshold, the specific threshold determined according to a power amplifier parameter applied to carrier aggregation and receiver performance of the mobile terminal, or compare whether a sum of the uplink transmit powers of carriers obtained by the obtaining module exceeds a preset threshold; and a notifying module, configured to send first notification signaling to a base station when the difference between the obtained uplink transmit powers of different carriers exceeds the specific threshold, or configured to send second notification signaling to a base station when the sum of the obtained uplink transmit powers of the carriers exceeds the preset threshold, wherein the comparing module comprises:
a specific threshold determining submodule, configured to determine the specific threshold $M_2$ according to a difference between the power amplifier parameter $P_T$ applied to the carrier aggregation and the receiver performance parameter $\Delta_2$ of the mobile terminal, wherein $M_2 = P_T - \Delta_2$;

the comparing module comprises:
a preset threshold determining submodule, configured to determine the preset threshold $M_1$ according to a difference between a minimum value $P_{max}$ and a resource management parameter $\Delta_1$ planned by a network, wherein the minimum value $P_{max}$ is a smaller value of maximum transmit power of the mobile terminal and maximum allowed power configured by the base station, wherein $M_1 = P_{max} - \Delta_1$.

4. The mobile terminal according to claim 3, wherein:
the first and second notification signals by the mobile terminal cause the base station to perform carrier adjustment according to information carried in the mobile terminal first notification signaling which indicates that the difference between the uplink transmit powers of different carriers exceeds the specific threshold, or according to information carried in the mobile terminal second notification signaling which indicates that the sum of the uplink transmit powers of the carriers exceeds the preset threshold.

5. A method for controlling uplink power of a Long Term Evolution (LTE) system, comprising:
receiving first notification signaling or second notification signaling sent by a mobile terminal, wherein the first notification signaling carries information indicating that a difference between uplink transmit powers of different carriers exceeds a specific threshold, the specific threshold determined according to a power amplifier parameter applied to carrier aggregation and receiver performance of the mobile terminal, and the second notification signaling carries information indicating that a sum of the uplink transmit powers of carriers exceeds a preset threshold; and
performing carrier adjustment according to the information carried in the first notification signaling which indicates that the difference between the uplink transmit powers of different carriers exceeds the specific threshold, or according to the information carried in the second notification signaling which indicates that the sum of the uplink transmit powers of carriers exceeds the preset threshold, wherein the specific threshold comprises:

$M_2 = P_T - \Delta_2$, wherein $M_2$ is the specific threshold, $P_T$ is determined according to the power amplifier parameter applied to the carrier aggregation, and $\Delta_2$ is determined according to the receiver performance of the mobile terminal;
the preset threshold comprises:

$M_1 = P_{max} - \Delta_1$, wherein $M_1$ is the preset threshold, $P_{max}$ is a smaller value of the maximum transmit power of the mobile terminal and the maximum allowed power configured by the base station, and $\Delta_1$ is determined according to the resource management parameter planned by a network.

6. The method according to claim 5, wherein:
the performing the carrier adjustment according to the information carried in the first notification signaling comprises:
adjusting uplink power of a heavier-loaded carrier to a lighter-loaded carrier if a power control requirement is fulfilled by adjusting the uplink power of the heavier-loaded carrier to the lighter-loaded carrier; or
decreasing physical resource blocks of a non real-time service if a power control requirement is fulfilled by decreasing the physical resource blocks of the non real-time service; or
interrupting a low-performance carrier.

7. The method according to claim 5, wherein:
the performing the carrier adjustment according to the information carried in the second notification signaling comprises:
adjusting uplink power of a heavier-loaded carrier to a lighter-loaded carrier if a power control requirement is fulfilled by adjusting the uplink power of the heavier-loaded carrier to the lighter-loaded carrier; or
decreasing physical resource blocks of a non real-time service if a power control requirement is fulfilled by decreasing the physical resource blocks of the non real-time service; or
interrupting a low-performance carrier; or
deferring sending service data on carriers and affixing a mark if the sending of the service data on the carriers is deferrable.

8. A base station, comprising:
a receiving unit, configured to receive first notification signaling or second notification signaling sent by a mobile terminal, wherein the first notification signaling carries information indicating that a difference between uplink transmit powers of different carriers exceeds a specific threshold, the specific threshold determined according to a power amplifier parameter applied to carrier aggregation and receiver performance of the mobile terminal, and the second notification signaling carries information indicating that a sum of the uplink transmit powers of carriers exceeds a preset threshold; and
a carrier adjusting unit, configured to perform carrier adjustment according to the information carried in the first notification signaling which indicates that the difference between the uplink transmit powers of different carriers exceeds the specific threshold, or according to the information carried in the second notification signaling which indicates that the sum of the uplink transmit powers of carriers exceeds the preset threshold, wherein when the carrier adjusting unit is configured to perform carrier adjustment according to the information carried in the first notification signaling, the carrier adjusting unit comprises:
a first determining subunit, configured to determine whether a power control requirement is fulfilled by adjusting obtained uplink power of a heavier-loaded carrier to a lighter-loaded carrier, or determine whether a power control requirement is fulfilled by decreasing physical resource blocks of a non real-time service,
a first uplink power adjusting subunit, configured to adjust uplink power of the heavier-loaded carrier to the lighter-loaded carrier after the first determining subunit determines that the power control requirement is fulfilled by adjusting the obtained uplink power of the heavier-loaded carrier to the lighter-loaded carrier, a first physical resource block adjusting subunit, configured to decrease the physical resource blocks of the non real-time service after the first determining subunit determines that the power control requirement is fulfilled by decreasing the physical resource blocks of the non real-time service, and a carrier interrupting subunit, configured to interrupt a low-performance carrier: or wherein when the carrier adjusting unit is configured to perform carrier adjustment according to the information carried in the second notification signaling, the carrier adjusting unit comprises:

a second determining subunit, configured to determine whether a power control requirement is fulfilled by adjusting obtained uplink power of a heavier-loaded carrier to a lighter-loaded carrier, or determine whether a power control requirement is fulfilled by decreasing physical resource blocks of a non real-time service, or determine whether sending service data on the carriers is deferrable, a second uplink power adjusting subunit, configured to adjust uplink power of the heavier-loaded carrier to the lighter-loaded carrier after the second determining subunit determines that the power control requirement is fulfilled by adjusting the obtained uplink power of the heavier-loaded carrier to the lighter-loaded carrier, a second physical resource block adjusting subunit, configured to decrease the physical resource blocks of the non real-time service after the second determining subunit determines that the power control requirement is fulfilled by decreasing the physical resource blocks of the non real-time service, a carrier interrupting subunit, configured to interrupt a low-performance carrier, and a sending deferring subunit, configured to defer sending the service data that is on the carriers and affix a mark if the second determining subunit determines that the sending of the service data on the carriers is deferrable.

9. The method according to claim 8, wherein the specific threshold comprises:

$$M_2 = P_T - \Delta_2, \text{ wherein}$$

$M_2$ is the specific threshold, $P_T$ is determined according to the power amplifier parameter applied to the carrier aggregation, and $\Delta_2$ is determined according to the receiver performance of the mobile terminal;

the preset threshold comprises:

$$M_1 = P_{max} - \Delta_1, \text{ wherein}$$

$M_1$ is the preset threshold, $P_{max}$ is a smaller value of the maximum transmit power of the mobile terminal and the maximum allowed power configured by the base station, and $\Delta_1$ is determined according to the resource management parameter planned by the network.

* * * * *

UNITED STATES PATENT AND TRADEMARK OFFICE
CERTIFICATE OF CORRECTION

PATENT NO. : 9,072,062 B2  
APPLICATION NO. : 13/446561  
DATED : June 30, 2015  
INVENTOR(S) : Dengkun Xiao et al.

Page 1 of 1

It is certified that error appears in the above-identified patent and that said Letters Patent is hereby corrected as shown below:

In the Claims

Claim 3, Column 10, Line 59: Delete "comparing" and insert --a comparing--, therefor.

Claim 3, Column 11, Line 18: Delete "$^P{}_{max}$" and insert --$P_{max}$--, therefor.

Claim 3, Column 11, Line 19: Delete "$\Delta_l$" and insert --$\Delta_1$--.

Claim 5, Column 11, Line 65: Delete "threshold," and insert --threshold;--, therefor.

Claim 5, Column 11, Line 65: Delete "of the" and insert --of--, therefor.

Claim 5, Column 11, Line 67: Delete "the" and insert --a--, therefor.

Claim 5, Column 12, Line 1: Delete "the" and insert --a--, therefor.

Claim 9, Column 14, Line 25: Delete "threshold," and insert --threshold;--, therefor, Claim 9, Column 14, Line 25: Delete "of the" after smaller value and insert --of--, therefor.

Claim 9, Column 14, Line 26: Delete "and the" and insert --and--, therefor.

Claim 9, Column 14, Line 27: Delete "the" and insert --a--, therefor.

Claim 9, Column 14, Line 27: Delete "station," and insert --station;--, therefor.

Claim 9, Column 14, Line 28: Delete "the" and insert --a--, therefor.

Claim 9, Column 14, Line 29: Delete "the" and insert --a--, therefor.

Claim 9, Column 14, Line 14: Delete "method" and insert --base station--, therefor.

Signed and Sealed this  
Twenty-ninth Day of December, 2015

Michelle K. Lee  
*Director of the United States Patent and Trademark Office*